United States Patent
Hiasa

(10) Patent No.: US 12,488,482 B2
(45) Date of Patent: Dec. 2, 2025

(54) IMAGE PROCESSING DEVICE, METHOD, AND PROGRAM FOR CONFIRMING ACCURACY BETWEEN 2D AND 3D IMAGES

(71) Applicant: FUJIFILM Corporation, Tokyo (JP)

(72) Inventor: Yuta Hiasa, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 313 days.

(21) Appl. No.: 18/181,550

(22) Filed: Mar. 10, 2023

(65) Prior Publication Data

US 2023/0316550 A1  Oct. 5, 2023

(30) Foreign Application Priority Data

Mar. 30, 2022 (JP) ................. 2022-057530

(51) Int. Cl.
   *G06T 7/38* (2017.01)
   *G06T 7/00* (2017.01)
   *G06T 11/00* (2006.01)

(52) U.S. Cl.
   CPC ............. *G06T 7/38* (2017.01); *G06T 7/0012* (2013.01); *G06T 11/00* (2013.01); *G06T 2207/10064* (2013.01); *G06T 2207/10076* (2013.01); *G06T 2207/30061* (2013.01); *G06T 2207/30096* (2013.01); *G06T 2210/41* (2013.01)

(58) Field of Classification Search
   CPC ......... G06T 7/38; G06T 7/0012; G06T 11/00; G06T 2207/10064; G06T 2207/10076; G06T 2207/30061; G06T 2207/30096; G06T 2210/41; G06T 2207/10016; G06T 2207/10068; G06T 2207/10132; G06T 2207/30092; G06T 7/33
   See application file for complete search history.

(56) References Cited

U.S. PATENT DOCUMENTS

| | | | |
|---|---|---|---|
| 2009/0281418 A1* | 11/2009 | Ruijters | A61B 6/5247 382/294 |
| 2013/0195338 A1* | 8/2013 | Xu | G06T 7/33 382/131 |
| 2018/0040147 A1* | 2/2018 | Alhrishy | A61B 6/5205 |

FOREIGN PATENT DOCUMENTS

JP  2020137796  9/2020

OTHER PUBLICATIONS

Toth et al. "3D/2D model-to-image registration by imitation learning for cardiac procedures"; Published one May 12, 2018; International Journal of Computer Assisted Radiology and Surgery (2018) 13:1141-1149. (Year: 2018).*

(Continued)

*Primary Examiner* — Siamak Harandi
(74) *Attorney, Agent, or Firm* — JCIPRNET

(57) ABSTRACT

A processor specifies a target position in a three-dimensional image acquired by imaging a subject before treatment, performs registration between two-dimensional images sequentially acquired for the subject under the treatment and the three-dimensional image, derives an evaluation result representing a reliability of the registration at least at the target position of the three-dimensional image, derives a range in which the target position possibly exists in the two-dimensional image based on a result of the registration and the evaluation result, and displays the two-dimensional image on which the range is superimposed.

14 Claims, 12 Drawing Sheets

(56) References Cited

OTHER PUBLICATIONS

Markelj, Primoz, et al., "A review of 3D/2D registration methods for image-guided interventions." Medical image analysis 16.3, Apr. 2012, pp. 1-20.
Daniel Toth et al., "3D/2D model-to-image registration by imitation learning for cardiac procedures.", IJCARS, May 12, 2018, pp. 1-9.
Koen A. J. Eppenhof et al., "Error estimation of deformable image registration of pulmonary CT scans using convolutional neural networks." Journal of Medical Imaging, May 10, 2018, pp. 1-12.

* cited by examiner

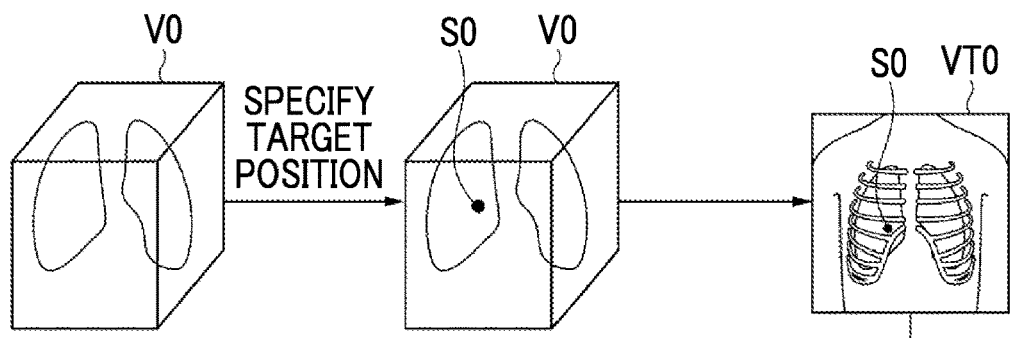
FIG. 4
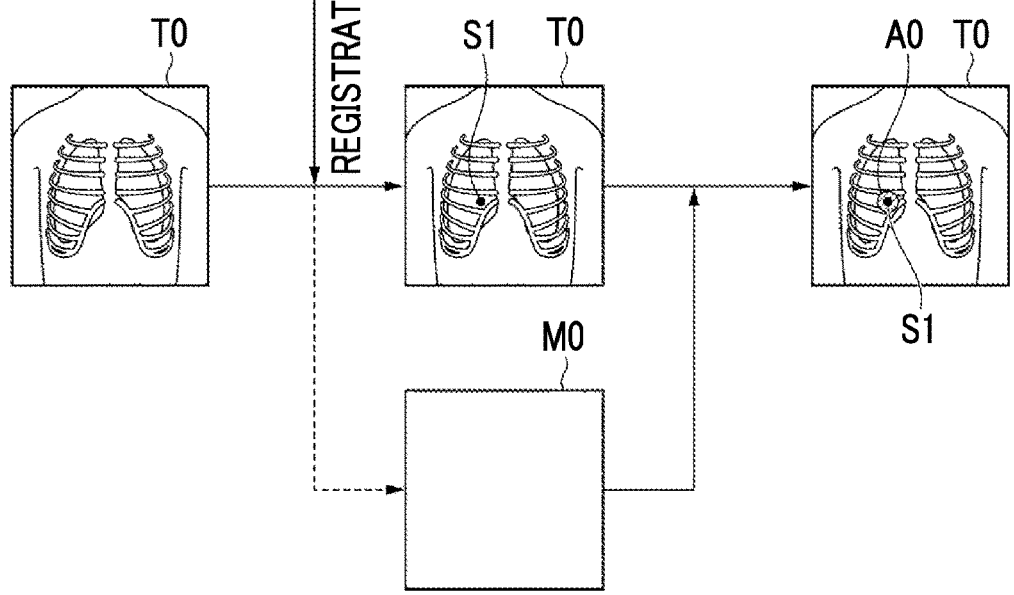
FIG. 5
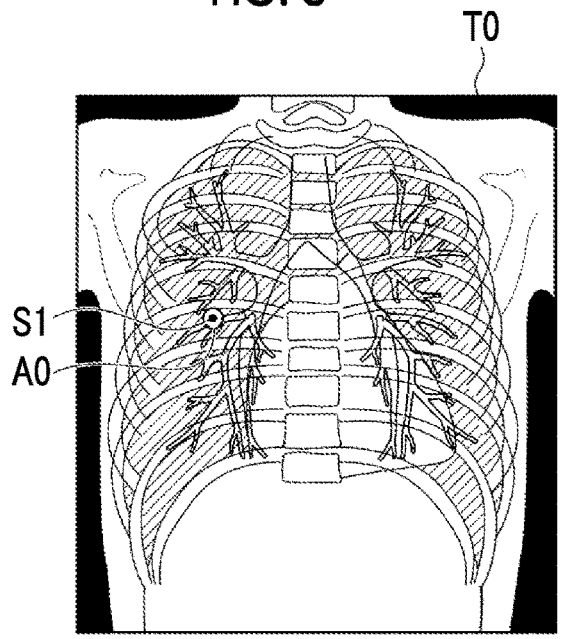

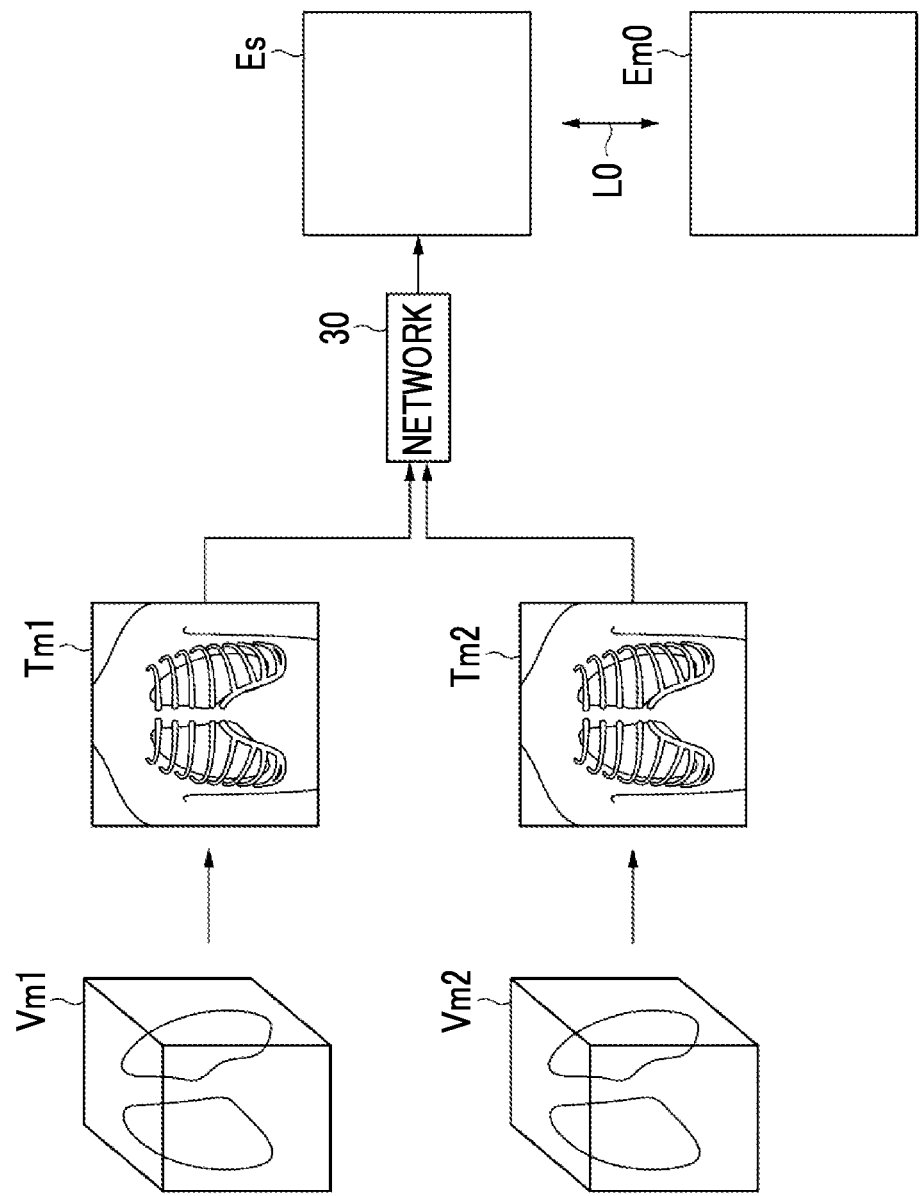

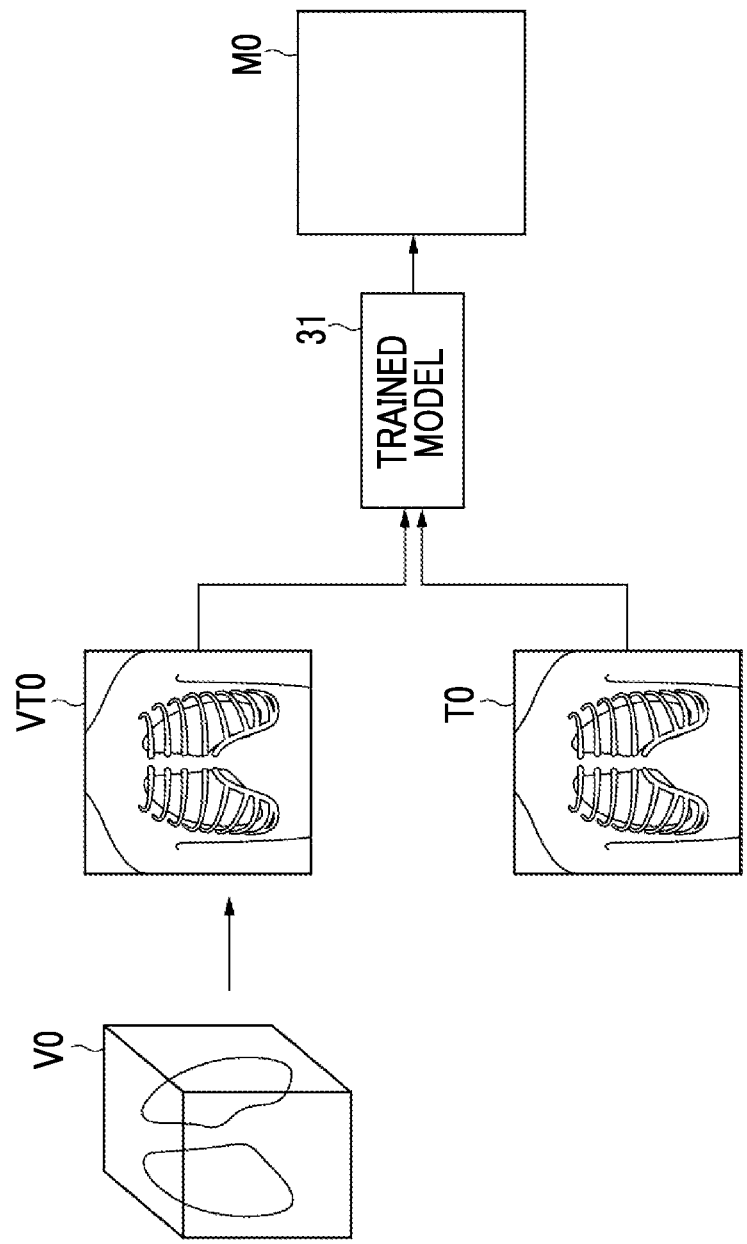

IMAGE PROCESSING DEVICE, METHOD, AND PROGRAM FOR CONFIRMING ACCURACY BETWEEN 2D AND 3D IMAGES

CROSS REFERENCE TO RELATED APPLICATIONS

The present application claims priority from Japanese Patent Application No. 2022-057530, filed on Mar. 30, 2022, the entire disclosure of which is incorporated herein by reference.

BACKGROUND

Technical Field

The present disclosure relates to an image processing device, method, and program.

Related Art

It has been performed that an ultrasonic endoscope having an endoscopic observation part and an ultrasonic observation part at a distal end thereof is inserted into a lumen such as a digestive organ or a bronchus of a subject, and an endoscopic image in the lumen and an ultrasound image of a site such as a lesion located outside a lumen wall are picked up. In addition, a biopsy treatment has also been performed in which a tissue at a site located outside the lumen wall is collected with a treatment tool such as a forceps attached to a distal end of the endoscope.

In performing such a treatment using the ultrasonic endoscope, it is important that the ultrasonic endoscope accurately reaches a target position in the subject. Therefore, it has been performed that a positional relationship between the ultrasonic endoscope and a human body structure is understood by continuously irradiating the subject with radiation from a radiation source during the treatment and performing fluoroscopic imaging to display the acquired fluoroscopic image in real time.

Here, since the fluoroscopic image includes overlapping anatomical structures such as organs, blood vessels, and bones in the subject, it is not easy to recognize the lumen and the lesion. Therefore, it has been performed that a three-dimensional image of the subject is acquired in advance before the treatment using a computed tomography (CT) device, a magnetic resonance imaging (MRI) device, and the like, a lesion position is specified in the three-dimensional image, and the three-dimensional image and the fluoroscopic image are registered to specify the lesion position in the fluoroscopic image (for example, refer to JP2020-137796A).

The technique described in JP2020-137796A performs registration between the three-dimensional image and the two-dimensional fluoroscopic image. For this reason, there may be a part where an accuracy of the registration is not sufficient in the fluoroscopic image. However, in the technique described in JP2020-137796A, since it is not known how accurately the registration is performed, work for causing the ultrasonic endoscope to reach the target position such as the lesion while seeing the fluoroscopic image may take time.

SUMMARY OF THE INVENTION

The present disclosure has been made in view of the above circumstances, and an object of the present disclosure is to enable confirmation of an accuracy of registration with a three-dimensional image in a two-dimensional image such as a fluoroscopic image.

An image processing device according to an aspect of the present disclosure comprises at least one processor, and the processor is configured to specify a target position in a three-dimensional image acquired by imaging a subject before treatment; perform registration between two-dimensional images sequentially acquired for the subject under the treatment and the three-dimensional image; derive an evaluation result representing a reliability of the registration at least at the target position of the three-dimensional image; derive a range in which the target position possibly exists in the two-dimensional image based on a result of the registration and the evaluation result; and display the two-dimensional image on which the range is superimposed.

In the image processing device according to the aspect of the present disclosure, the processor may be configured to superimpose and display, on the two-dimensional image, a corresponding target position corresponding to the target position in the two-dimensional image.

In addition, in the image processing device according to the aspect of the present disclosure, the processor may be configured to superimpose and display the evaluation result on the two-dimensional image.

In addition, in the image processing device according to the aspect of the present disclosure, the processor may be configured to derive the evaluation result by projecting, onto the three-dimensional image of the subject, a standard deformation amount between a first time phase and a second time phase of an organ including the target position, which is derived in advance based on a plurality of three-dimensional image groups including a three-dimensional image of the first time phase and a three-dimensional image of the second time phase.

Further, in the image processing device according to the aspect of the present disclosure, the three-dimensional image of the first time phase may be a three-dimensional image of an inspiratory phase, and the three-dimensional image of the second time phase may be a three-dimensional image of an expiratory phase.

Further, in the image processing device according to the aspect of the present disclosure, the processor may be configured to derive a pseudo two-dimensional image simulating a motion of an organ including the target position from the acquired three-dimensional image; derive a registration error representing a relative deformation amount and deformation direction between the pseudo two-dimensional image and the acquired three-dimensional image by performing registration between the pseudo two-dimensional image and the acquired three-dimensional image; and derive the evaluation result based on the registration error.

In addition, in the image processing device according to the aspect of the present disclosure, the processor may be configured to repeatedly perform registration between the two-dimensional image and the three-dimensional image; derive a relationship between the number of times of the registration and a degree of similarity between the registered two-dimensional image and three-dimensional image, which is derived each time the registration is performed; derive a plurality of local solutions in the relationship; and derive the evaluation result based on statistics of a registration error between the two-dimensional image and the three-dimensional image in a case where each of the plurality of local solutions is derived.

In addition, in the image processing device according to the aspect of the present disclosure, the processor may be configured to derive the evaluation result by using a trained model in which machine learning is performed such that in a case where a pseudo two-dimensional image obtained by projecting the three-dimensional image in an imaging direction of the two-dimensional image and the two-dimensional image are input, the evaluation result is output.

Further, in the image processing device according to the aspect of the present disclosure, the three-dimensional image may be a CT image.

In addition, in the image processing device according to the aspect of the present disclosure, the target position may be included in a lung of the subject.

In addition, in the image processing device according to the aspect of the present disclosure, the target position may be a position where a lesion is present in the lung.

In addition, in the image processing device according to the aspect of the present disclosure, the target position may be a bifurcation position in a bronchus.

An image processing method according to another aspect of the present disclosure comprises specifying a target position in a three-dimensional image acquired by imaging a subject before treatment; performing registration between two-dimensional images sequentially acquired for the subject under the treatment and the three-dimensional image; deriving an evaluation result representing a reliability of the registration at least at the target position of the three-dimensional image; deriving a range in which the target position possibly exists in the two-dimensional image based on a result of the registration and the evaluation result; and displaying the two-dimensional image on which the range is superimposed.

An image processing program according to still another aspect of the present disclosure causes a computer to execute a process comprising: specifying a target position in a three-dimensional image acquired by imaging a subject before treatment; performing registration between two-dimensional images sequentially acquired for the subject under the treatment and the three-dimensional image; deriving an evaluation result representing a reliability of the registration at least at the target position of the three-dimensional image; deriving a range in which the target position possibly exists in the two-dimensional image based on a result of the registration and the evaluation result; and displaying the two-dimensional image on which the range is superimposed.

According to the above aspects of the present disclosure, it is possible to confirm the accuracy of the registration with the three-dimensional image in the two-dimensional image such as the fluoroscopic image.

BRIEF DESCRIPTION OF THE DRAWINGS

FIG. 4 is a diagram schematically showing a process performed by the image processing device according to the first embodiment.

FIG. 5 is a diagram showing a range in which a corresponding target position may exist.

FIG. 14 is a diagram for explaining learning in the fifth embodiment.

FIG. 15 is a diagram for explaining derivation of an evaluation result in the fifth embodiment.

DETAILED DESCRIPTION

Figure 1:
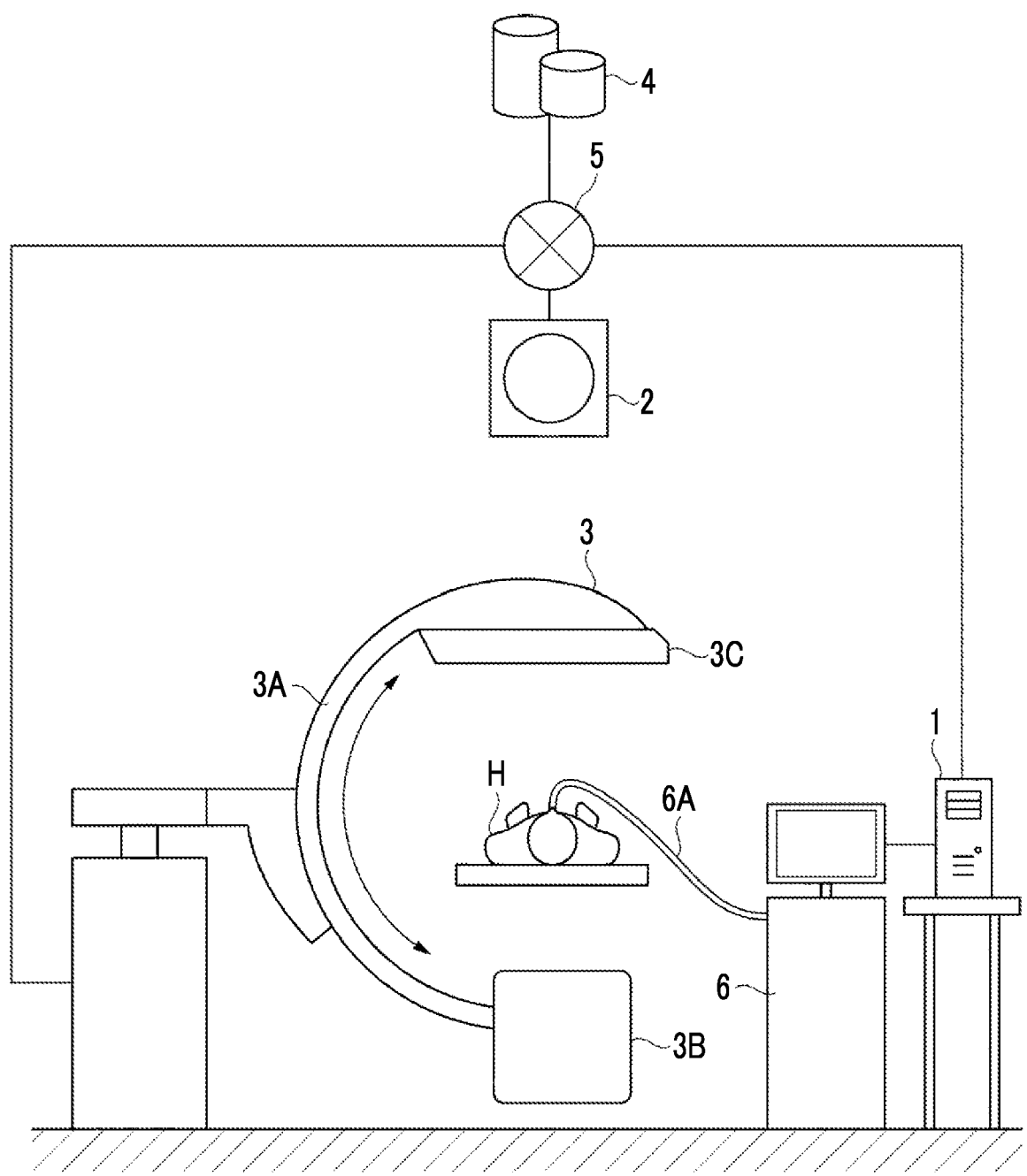
FIG. 1 is a diagram showing a schematic configuration of a medical information system to which an image processing device according to a first embodiment of the present disclosure is applied.

Hereinafter, embodiments of the present disclosure will be described with reference to the drawings. First, a configuration of a medical information system to which an image processing device according to a first embodiment is applied will be described. FIG. 1 is a diagram showing a schematic configuration of the medical information system. In the medical information system shown in FIG. 1, a computer 1 including the image processing device according to the first embodiment, a three-dimensional image pick-up device 2, a fluoroscopic image pick-up device 3, and an image storage server 4 are connected in a communicable state via a network 5.

The computer 1 includes the image processing device according to the first embodiment, and an image processing program of the first embodiment is installed in the computer 1. The computer 1 is installed in a treatment room where a subject is treated as described below. The computer 1 may be a workstation or a personal computer directly operated by a medical worker performing treatment or may be a server computer connected thereto via a network. The image processing program is stored in a storage device of the server computer connected to the network or in a network storage in a state of being accessible from the outside, and is downloaded and installed in the computer 1 used by a doctor in response to a request. Alternatively, the image processing program is distributed by being recorded on a recording medium such as a digital versatile disc (DVD) or a compact disc read only memory (CD-ROM) and is installed on the computer 1 from the recording medium.

The three-dimensional image pick-up device 2 is a device generating a three-dimensional image representing a treatment target site of a subject H by imaging the site and is specifically, a CT device, an MRI device, a positron emission tomography (PET) device, and the like. The three-dimensional image including a plurality of tomographic images generated by the three-dimensional image pick-up device 2 is transmitted to and stored in the image storage server 4. In addition, in the present embodiment, the treatment target site of the subject H is the lung, and the three-dimensional image pick-up device 2 is the CT device. A CT image including a chest of the subject H is acquired in advance as a three-dimensional image by imaging the chest of the subject H before treatment of the subject H as described below and stored in the image storage server 4.

The fluoroscopic image pick-up device 3 includes a C-arm 3A, an X-ray source 3B, and an X-ray detector 3C. The X-ray source 3B and the X-ray detector 3C are attached to both ends of the C-arm 3A, respectively. In the fluoroscopic image pick-up device 3, the C-arm 3A is configured to be rotatable and movable such that the subject H can be imaged from any direction. As will be described later, the fluoroscopic image pick-up device 3 sequentially acquires X-ray images of the subject H by performing fluoroscopic imaging in which the subject H is continuously irradiated with X-rays at a predetermined frame rate during the treatment of the subject H, and the X-rays transmitted through the subject H are sequentially detected by the X-ray detector 3C. In the following description, the X-ray images that are sequentially acquired will be referred to as fluoroscopic images. The fluoroscopic image is an example of a two-dimensional image according to the aspect of the present disclosure.

The image storage server 4 is a computer that stores and manages various types of data, and includes a large-capacity external storage device and database management software. The image storage server 4 communicates with another device via the wired or wireless network 5 and transmits and receives image data and the like. Specifically, various types of data including image data of the three-dimensional image acquired by the three-dimensional image pick-up device 2 and the fluoroscopic image acquired by the fluoroscopic image pick-up device 3 are acquired via the network, and managed by being stored in a recording medium such as a large-capacity external storage device. A storage format of the image data and the communication between the respective devices via the network 5 are based on a protocol such as digital imaging and communication in medicine (DI-COM).

In the present embodiment, it is assumed that a biopsy treatment is performed in which while performing fluoroscopic imaging of the subject H, a part of a lesion such as a pulmonary nodule existing in the lung of the subject H is excised to examine the presence or absence of a disease in detail. For this reason, the fluoroscopic image pick-up device 3 is disposed in a treatment room for performing a biopsy. In addition, an ultrasonic endoscope device 6 is installed in the treatment room. The ultrasonic endoscope device 6 comprises an endoscope 6A to which a treatment tool such as an ultrasound probe and a forceps is attached to a distal end thereof. In the present embodiment, in order to perform a biopsy of the lesion, an operator inserts the endoscope 6A into the bronchus of the subject H, picks up a fluoroscopic image of the subject H with the fluoroscopic image pick-up device 3, confirms a distal end position of the endoscope 6A in the subject H in the fluoroscopic image while displaying the picked-up fluoroscopic image in real time, and moves the distal end of the endoscope 6A to a target position of the lesion.

Here, lung lesions such as pulmonary nodules occur outside the bronchus rather than inside the bronchus. Therefore, after moving the distal end of the endoscope 6A to the target position, the operator picks up an ultrasound image of the outside of the bronchus with the ultrasound probe, displays the ultrasound image, and performs treatment of collecting a part of the lesion using a treatment tool such as a forceps while confirming a position of the lesion in the ultrasound image.

Figure 2:
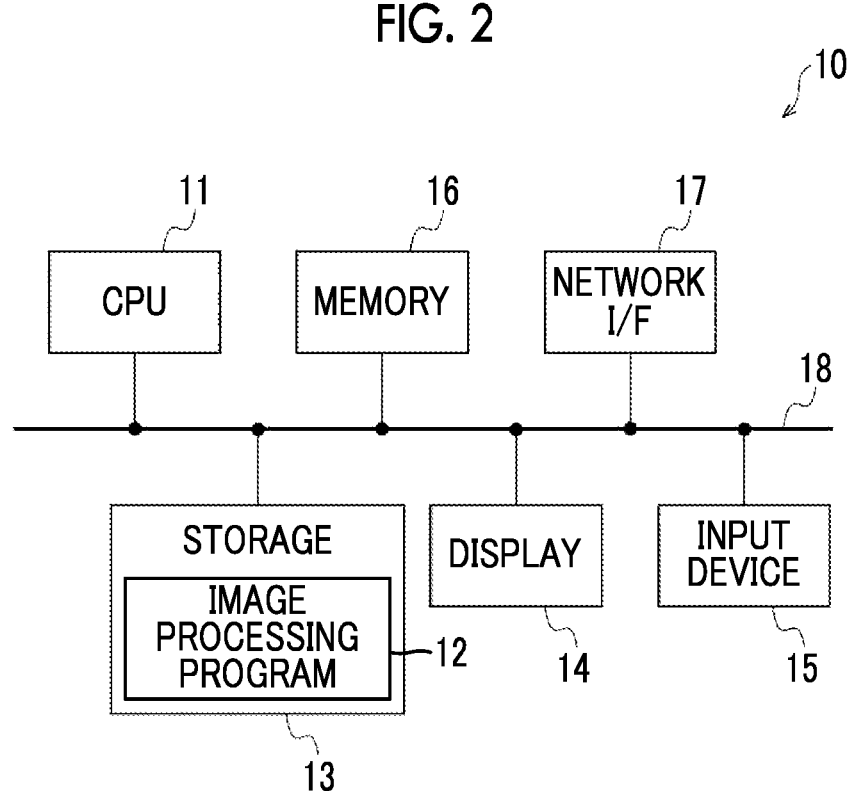
FIG. 2 is a diagram showing the schematic configuration of the image processing device according to the first embodiment.

Next, the image processing device according to the first embodiment will be described. FIG. 2 is a diagram showing a hardware configuration of the image processing device according to the first embodiment. As shown in FIG. 2, the image processing device 10 includes a central processing unit (CPU) 11, a non-volatile storage 13, and a memory 16 as a temporary storage area. In addition, the image processing device 10 includes a display 14 such as a liquid crystal display, an input device 15 such as a keyboard and a mouse, and a network interface (I/F) 17 connected to the network 5. The CPU 11, the storage 13, the display 14, the input device 15, the memory 16, and the network I/F 17 are connected to a bus 18. The CPU 11 is an example of the processor in the aspect of the present disclosure.

The storage 13 is realized by, for example, a hard disk drive (HDD), a solid state drive (SSD), a flash memory, and the like. An image processing program 12 is stored in the storage 13 as a storage medium. The CPU 11 reads out the image processing program 12 from the storage 13, expands the image processing program 12 in the memory 16, and executes the expanded image processing program 12.

Figure 3:
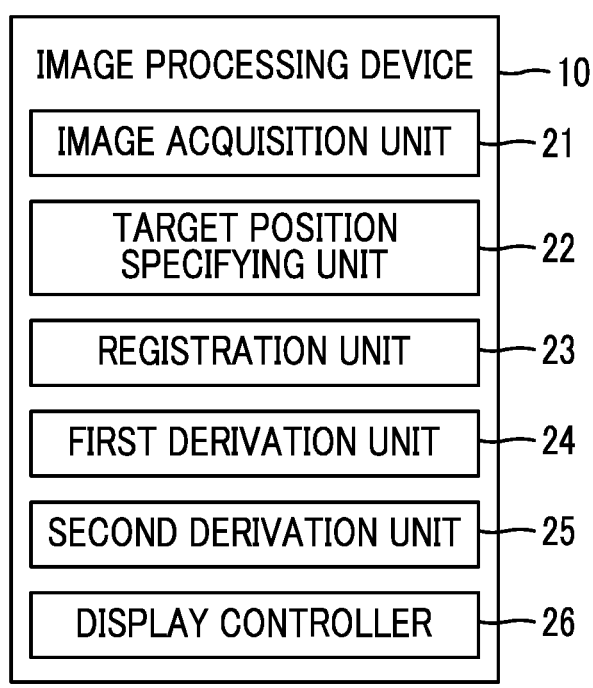
FIG. 3 is a functional configuration diagram of the image processing device according to the first embodiment.

Next, a functional configuration of the image processing device according to the first embodiment will be described. FIG. 3 is a diagram showing the functional configuration of the image processing device according to the first embodiment. FIG. 4 is a diagram schematically showing a process performed by the image processing device according to the first embodiment. As shown in FIG. 3, the image processing device 10 comprises an image acquisition unit 21, a target position specifying unit 22, a registration unit 23, a first derivation unit 24, a second derivation unit 25, and a display controller 26. Then, by executing the image processing program 12 by the CPU 11, the CPU 11 functions as the target position specifying unit 22, the registration unit 23, the first derivation unit 24, the second derivation unit 25, and the display controller 26.

The image acquisition unit 21 acquires a three-dimensional image V0 of the subject H from the image storage server 4 in response to an instruction from the input device 15 by the operator. In addition, the image acquisition unit 21 sequentially acquires the fluoroscopic image T0 acquired by the fluoroscopic image pick-up device 3 during the treatment of the subject H.

The target position specifying unit 22 detects the lesion from the three-dimensional image V0 by using a known computer-aided diagnosis (CAD; hereinafter referred to as CAD) algorithm. Then, a centroid position of the detected lesion is specified as a target position S0. As a detection technique using CAD, a technique using a machine learning model in which machine learning is performed so as to detect a lesion can be used. The technique for detecting the lesion by the target position specifying unit 22 is not limited thereto, and any technique such as template matching can be used. In addition, the target position specifying unit 22 may specify a position designated by the operator in the displayed three-dimensional image V0 by using the input device 15 as the target position.

The registration unit 23 performs registration between the fluoroscopic images T0 that are sequentially acquired and the three-dimensional image V0. Here, the fluoroscopic image T0 is a two-dimensional image. Therefore, the registration unit 23 performs the registration between the two-dimensional image and the three-dimensional image. In the present embodiment, first, the registration unit 23 projects the three-dimensional image V0 in the same direction as the imaging direction of the fluoroscopic image T0 to derive a two-dimensional pseudo fluoroscopic image VT0. Then, the registration unit 23 performs the registration between the two-dimensional pseudo fluoroscopic image VT0 and the fluoroscopic image T0. At the time of the registration, the registration unit 23 derives a relative deformation amount and deformation direction between each pixel of the fluoroscopic image T0 and each pixel of the two-dimensional pseudo fluoroscopic image VT0 as a registration error. In addition, the registration unit 23 derives a corresponding target position S1 in the fluoroscopic image T0 that corresponds to the target position S0 in the three-dimensional image V0 specified by the target position specifying unit 22 through the registration.

As a technique for registration between the two-dimensional image and the three-dimensional image, any technique, for example, the techniques described in Markelj, Primoz, et al. "A review of 3D/2D registration methods for image-guided interventions." Medical image analysis 16.3 (2012): 642-661, and Toth, et al., "3D/2D model-to-image registration by imitation learning for cardiac procedures.", IJCARS, 2018, can be used.

In the first embodiment, an evaluation map M0 is two-dimensional. The first derivation unit 24 derives an evaluation result representing a reliability of the registration. In the present embodiment, the first derivation unit 24 derives, as the evaluation result, an evaluation map M0 having a pixel value of each pixel corresponding to the deformation amount included in the registration error derived by the registration unit 23 as an evaluation value. The evaluation map M0 may be two-dimensional or three-dimensional, but in the first embodiment, the two-dimensional evaluation map M0 is derived as the evaluation result. Each pixel of the two-dimensional evaluation map M0 corresponds to each pixel of the fluoroscopic image T0. On the other hand, each pixel of the three-dimensional evaluation map M0 corresponds to each pixel of the three-dimensional image V0.

Here, in a case where the registration by the registration unit 23 is performed with high accuracy, the deformation amount derived by the registration is small, so that the evaluation value is small. On the other hand, in a case where the accuracy of the registration is low, the deformation amount is large, so that the evaluation value is great. Therefore, the smaller the evaluation value in the evaluation map M0, the higher the reliability of the registration. The first derivation unit 24 may derive only the evaluation value of the three-dimensional image V0 at the target position S0 as the evaluation result.

The second derivation unit 25 derives a range in which the corresponding target position S1 in the fluoroscopic image T0 may exist based on a result of the registration by the registration unit 23 and the evaluation map M0 derived by the first derivation unit 24. Specifically, the second derivation unit 25 refers to an evaluation value of the corresponding target position S1 in the evaluation map M0 and derives a range A0 which has a size corresponding to the evaluation value and in which the target position S0 in the three-dimensional image V0 may exist. In this case, the smaller the evaluation value, the smaller the size of the range A0 in which the target position S0 may exist. For example, in a case where the evaluation value is small, the size of the range A0 is small as shown in FIG. 5, but in a case where the evaluation value is great, the size of the range A0 is large as shown in FIG. 6.

Figure 6:
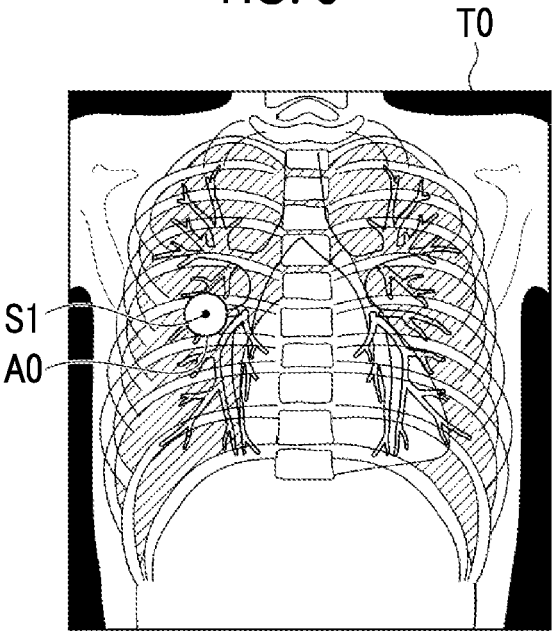
FIG. 6 is a diagram showing a range in which a corresponding target position may exist.

As shown in FIG. 5 or FIG. 6, the display controller 26 displays the fluoroscopic image T0 on which the range A0 derived by the second derivation unit 25 is superimposed, on the display 14. The range A0 may be a circular region having a radius corresponding to the evaluation value, but is not limited thereto. Further, in FIGS. 5 and 6, in addition to the range A0, the corresponding target position S1 is also superimposed and displayed on the fluoroscopic image T0, but the present disclosure is not limited thereto. Only the range A0 may be superimposed and displayed on the fluoroscopic image T0 without displaying the corresponding target position S1.

Figure 7:
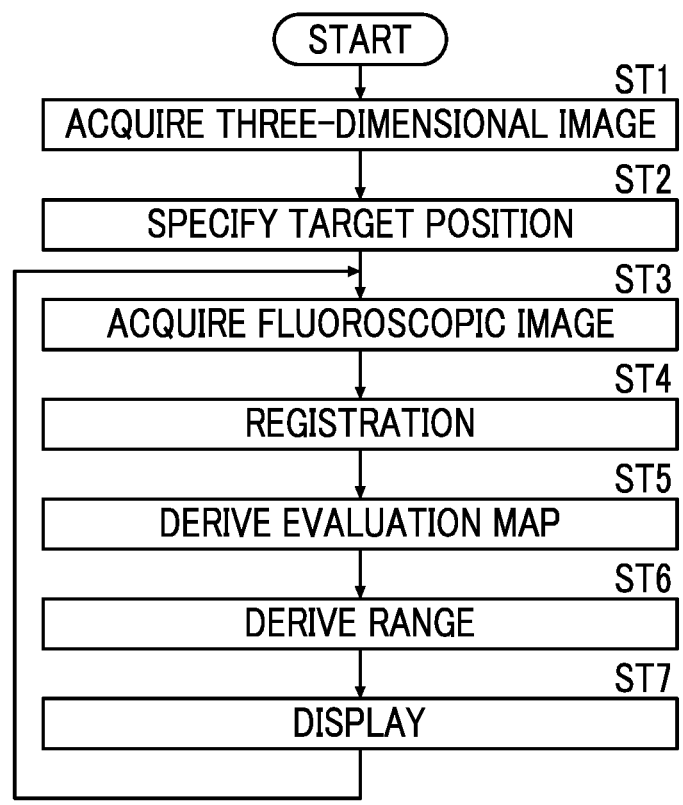
FIG. 7 is a flowchart showing a process performed in the first embodiment.

Next, a process performed in the first embodiment will be described. FIG. 7 is a flowchart showing the process performed in the first embodiment. First, the image acquisition unit 21 acquires the three-dimensional image V0 from the image storage server 4 (step ST1), and the target position specifying unit 22 specifies the target position S0 in the three-dimensional image V0 (step ST2). Subsequently, the image acquisition unit 21 acquires the fluoroscopic image T0 (step ST3), and the registration unit 23 performs the registration between the three-dimensional image V0 and the fluoroscopic image T0 (step ST4).

Next, the first derivation unit 24 derives the evaluation map M0 showing the reliability of the registration as the evaluation result (step ST5), and the second derivation unit 25 derives the range A0 which has a size corresponding to the evaluation value of the corresponding target position S1 in the evaluation map M0 and in which the target position S0 in the three-dimensional image V0 may exist in the fluoroscopic image T0 (step ST6). Then, the display controller 26 displays the fluoroscopic image T0 on which the range A0 is superimposed, on the display 14 (step ST7), and the process returns to step ST3. As a result, the processes of steps ST4 to ST7 are performed on the fluoroscopic images T0 that are sequentially acquired.

Figure 8:
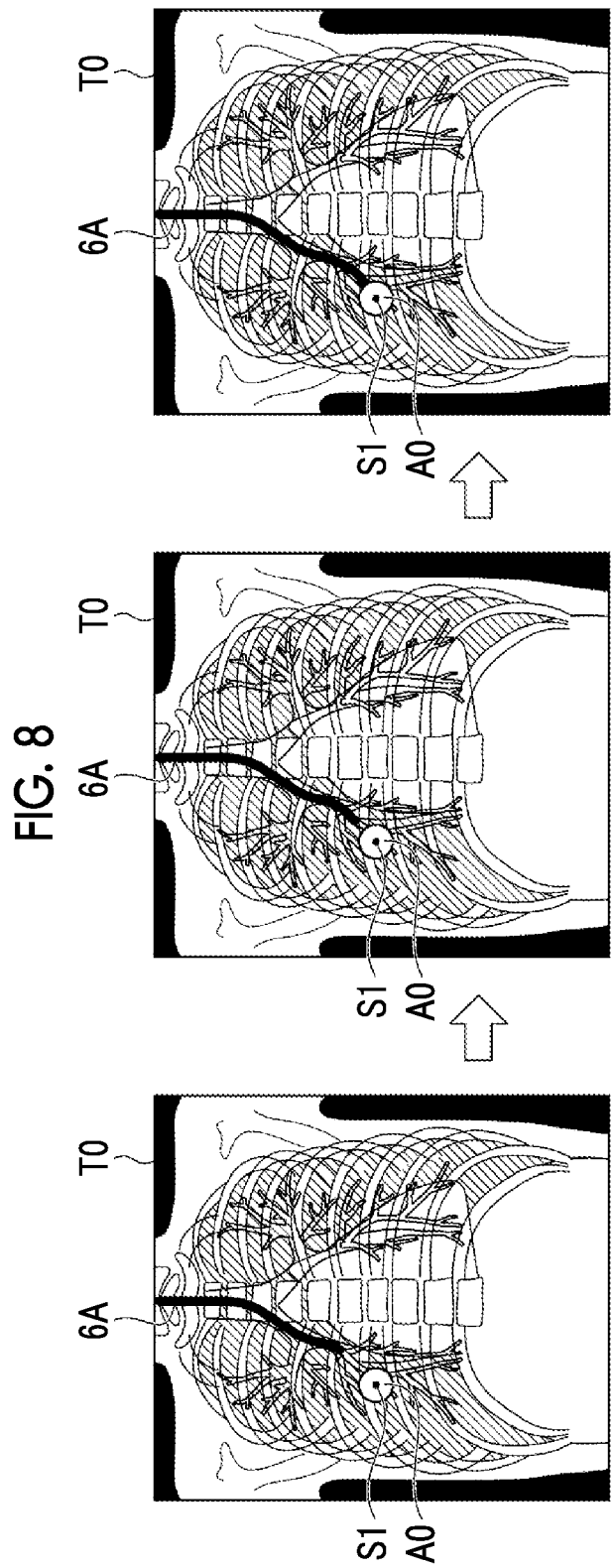
FIG. 8 is a diagram showing fluoroscopic images sequentially acquired in the first embodiment.

FIG. 8 is a diagram showing the fluoroscopic images T0 sequentially acquired in the first embodiment. In the present embodiment, a lesion tissue is collected using the ultrasonic endoscope device 6 for the biopsy. Therefore, the operator moves the distal end of the endoscope 6A toward the range A0 while looking at the endoscope 6A represented in the fluoroscopic image T0 displayed on the display 14. Accordingly, in the fluoroscopic images T0 that are sequentially acquired, the distal end of the endoscope 6A gradually moves toward the range A0.

Here, in the present embodiment, the fluoroscopic image T0 on which the range A0 having a size corresponding to the evaluation result is superimposed is displayed. Therefore, the accuracy of the registration between the fluoroscopic image T0 and the three-dimensional image V0 can be confirmed based on the size of the range A0.

Here, in a case where the size of the range A0 is small, the lesion tissue can be collected without picking up the ultrasound image with the ultrasound probe in a case where the distal end of the endoscope 6A is brought within the range A0. On the other hand, in a case where the range A0 is large, since it is unclear in which location of the range A0 the lesion is present, an ultrasound image in the vicinity of the range A0 may be acquired by the ultrasound probe and displayed on the display 14, a position of the lesion may be confirmed by the displayed ultrasound image, and the lesion tissue may be collected.

Therefore, according to the present embodiment, it is possible to determine whether or not to use the ultrasound probe based on the size of the range A0 and collect the lesion.

In the first embodiment, the evaluation map M0 is two-dimensional, but the present disclosure is not limited thereto. The three-dimensional evaluation map M0 may be derived by deriving the deformation amount and the deformation direction of each pixel of the three-dimensional image V0 with respect to each corresponding pixel of the fluoroscopic image T0 as the registration error. In this case, the second derivation unit 25 refers to the evaluation value of the target position S0 in the three-dimensional evaluation map M0 and derives the range A0 which has a size corresponding to the evaluation value and in which the target position may exist.

Next, a second embodiment of the present disclosure will be described. Since the functional configuration of the image processing device according to the second embodiment is the same as the functional configuration of the image processing device according to the first embodiment shown in FIG. 3, a detailed description of the configuration will be omitted here. In the image processing device according to the second embodiment, the technique for deriving the evaluation result in the first derivation unit 24 is different from that of the first embodiment.

In the second embodiment, the first derivation unit 24 derives a standard deformation amount between a first time phase and a second time phase of an organ including the target position in advance before the treatment of the subject H based on a plurality of three-dimensional image groups including a three-dimensional image of the first time phase and a three-dimensional image of the second time phase. Here, in the present embodiment, a treatment of collecting a tissue of a lung lesion is performed as a biopsy. Therefore, the organ including the target position is the lung, the three-dimensional image of the first time phase is a three-dimensional image of an inspiratory phase, and the three-dimensional image of the second time phase is a three-dimensional image of an expiratory phase. The plurality of three-dimensional image groups include three-dimensional image groups of another subject H other than the subject H that is a target of the biopsy. The plurality of three-dimensional image groups are stored in the image storage server 4, are acquired by the image acquisition unit 21 before the processing performed by the first derivation unit 24, and are stored in the storage 13.

Figure 9:
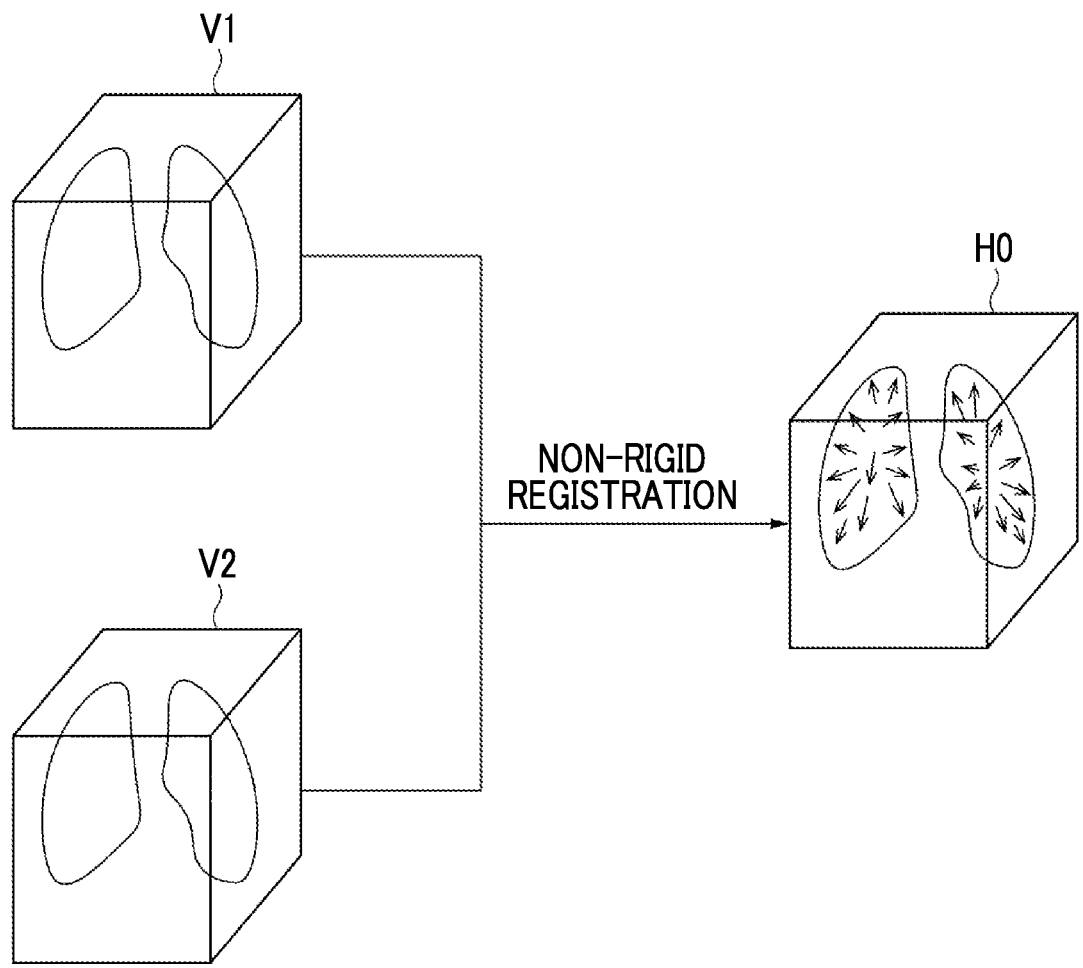
FIG. 9 is a diagram for explaining derivation of a deformation amount in a second embodiment.

FIG. 9 is a diagram for explaining the derivation of the deformation amount in the second embodiment. The first derivation unit 24 performs non-rigid registration between a three-dimensional image V1 of the first time phase, that is, the inspiratory phase, and a three-dimensional image V2 of the second time phase, that is, the expiratory phase, and derives a deformation amount and a deformation direction, that is, a deformation vector, between corresponding pixels of the three-dimensional image V1 and the three-dimensional image V2. In FIG. 9, the deformation vector in each pixel is indicated by a plurality of arrows. As a result, a deformation vector field H0 for each pixel position in the three-dimensional images V1 and V2 is acquired.

The first derivation unit 24 derives such a deformation vector field H0 for the plurality of three-dimensional image groups and derives a standard deformation amount of the lung between inspiration and exhalation. To this end, the first derivation unit 24 extracts a lung region from each of the plurality of three-dimensional image groups and derives an average shape of the extracted lung region as a shape of a standard lung. Further, the first derivation unit 24 derives a statistical value of the deformation vector field of each pixel in the derived standard lung as a standard deformation vector field SH0. Note that, as the statistical value, an average value, a median value, a dispersion value, or the like can be used, but the statistical value is not limited thereto.

Here, in the standard deformation vector field SH0, the accuracy of the registration between the fluoroscopic image T0 and the three-dimensional image V0 is low at a position where the deformation amount is large in the lung. On the other hand, at a position where the deformation amount is small in the lung, the accuracy of the registration between the fluoroscopic image T0 and the three-dimensional image V0 is high.

Figure 10:
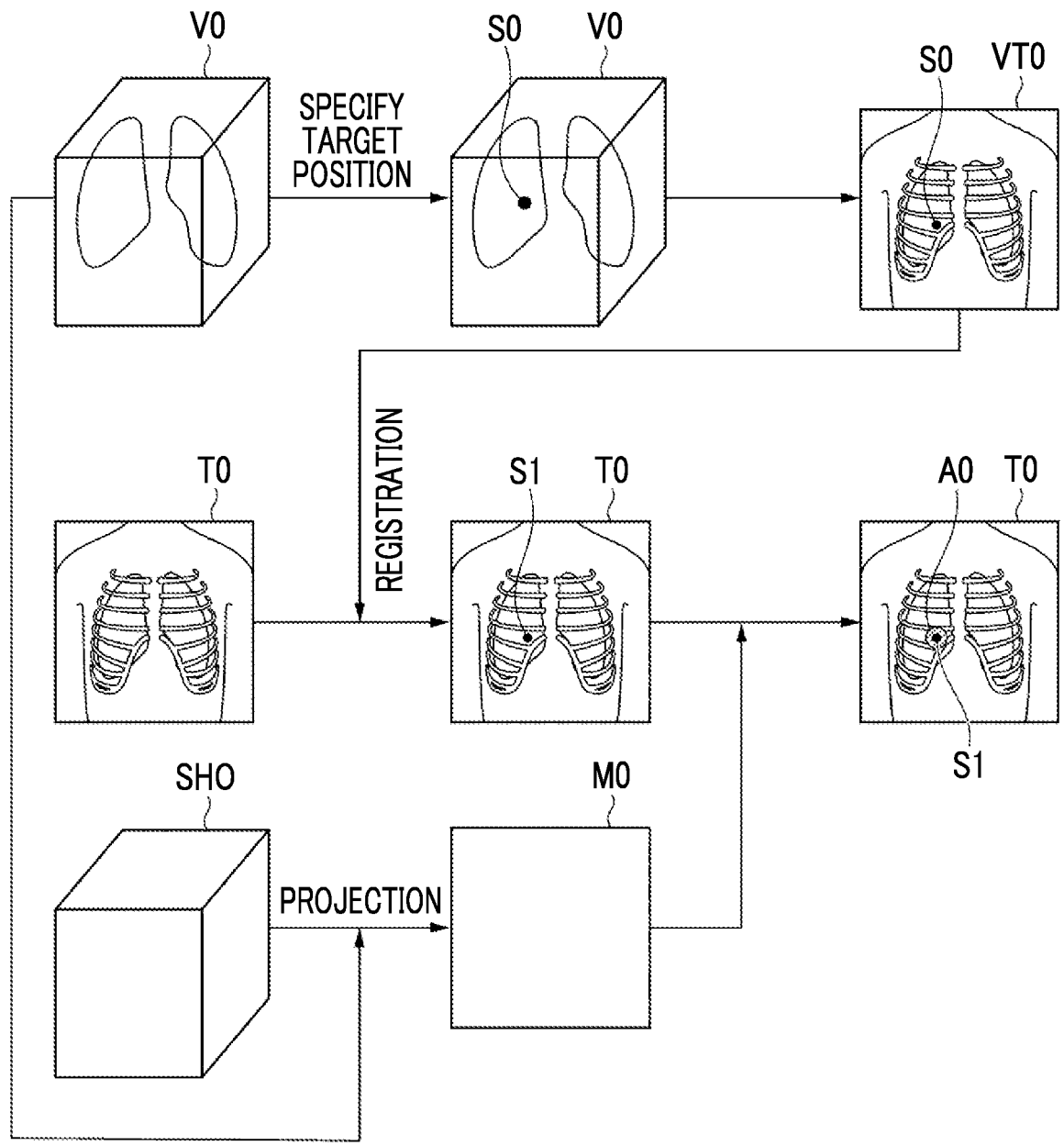
FIG. 10 is a diagram schematically showing a process performed by the image processing device according to the second embodiment.

Therefore, as shown in FIG. 10, in the second embodiment, the first derivation unit 24 derives the evaluation map M0 by projecting the standard deformation vector field SH0 onto the three-dimensional image V0 of the subject H. In the second embodiment, the evaluation map M0 is three-dimensional. Therefore, in the second embodiment, the second derivation unit 25 derives a two-dimensional evaluation map by projecting the evaluation map M0 in the imaging direction of the fluoroscopic image T0, refers to the evaluation value of the corresponding target position S1 in the two-dimensional evaluation map, and derives the range A0 which has a size corresponding to the evaluation value and in which the target position may exist.

By deriving the evaluation map M0 in this way, as in the first embodiment, the accuracy of the registration between the fluoroscopic image T0 and the three-dimensional image V0 can be confirmed according to the size of the range A0 superimposed on the fluoroscopic image T0.

Next, a third embodiment of the present disclosure will be described. Since the functional configuration of the image processing device according to the third embodiment is the same as the functional configuration of the image processing device according to the first embodiment shown in FIG. 3, a detailed description of the configuration will be omitted here. In the image processing device according to the third embodiment, the technique for deriving the evaluation result in the first derivation unit 24 is different from that of the first embodiment.

Figure 11:
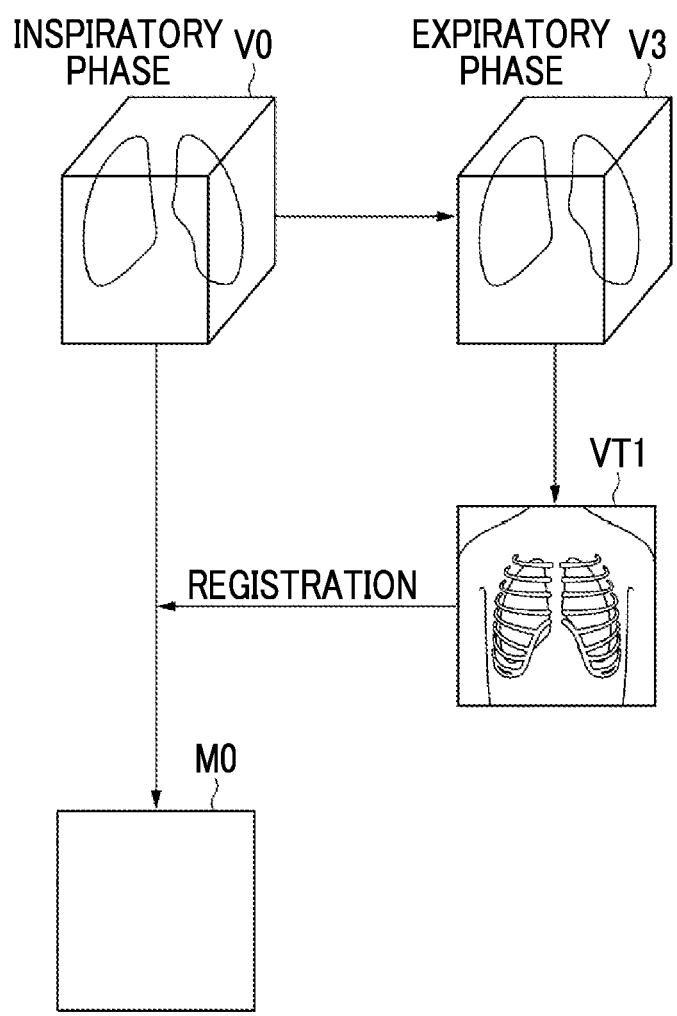
FIG. 11 is a diagram for explaining derivation of an evaluation result in a third embodiment.

FIG. 11 is a diagram for explaining the derivation of the evaluation result in the third embodiment. As shown in FIG. 11, in the third embodiment, the first derivation unit 24 derives a pseudo fluoroscopic image VT1 simulating a motion of the lung from the three-dimensional image V0. Here, picking up a CT image of the chest is often performed while holding a breath in a state of inspiration. Also in the present embodiment, it is assumed that the three-dimensional image V0 is the three-dimensional image V0 of the inspiratory phase acquired by performing imaging while holding the breath in a state of inspiration. Therefore, the first derivation unit 24 first derives a three-dimensional image V3 of the expiratory phase by deforming the three-dimensional image V0 of the inspiratory phase. Then, the first derivation unit 24 derives the pseudo fluoroscopic image VT1 by projecting the derived three-dimensional image V3 of the expiratory phase in a predetermined direction. Therefore, the pseudo fluoroscopic image VT1 represents a two-dimensional fluoroscopic image of the expiratory phase in a pseudo manner.

First, the three-dimensional image V0 may be projected in a predetermined direction to derive the two-dimensional image and the derived two-dimensional image may be deformed to derive the pseudo fluoroscopic image VT1 of the expiratory phase.

Next, the first derivation unit 24 performs registration between the pseudo fluoroscopic image VT1 of the expiratory phase and the three-dimensional image V0 of the inspiratory phase. The registration may be performed in the same manner as the technique performed by the registration unit 23 in the first embodiment. Accordingly, the first derivation unit 24 derives the deformation amount and the deformation direction of each pixel of the two-dimensional pseudo fluoroscopic image VT1 with respect to each corresponding pixel of the three-dimensional image V0 as the registration error. Then, the first derivation unit 24 derives the evaluation map M0 based on the derived registration error. The evaluation map M0 may be derived only for the corresponding target position S1 in the pseudo fluoroscopic image VT1.

In the third embodiment, the evaluation map M0 is two-dimensional, but the present disclosure is not limited thereto. The three-dimensional evaluation map M0 may be derived by deriving the deformation amount and the deformation direction of each pixel of the three-dimensional image V0 with respect to each corresponding pixel of the two-dimensional pseudo fluoroscopic image VT1 as the registration error. In this case, the second derivation unit 25 refers to the evaluation value of the target position S0 in the three-dimensional evaluation map M0 and derives the range A0 which has a size corresponding to the evaluation value and in which the target position may exist.

By deriving the evaluation map M0 in this way, as in the first embodiment, the accuracy of the registration between the fluoroscopic image T0 and the three-dimensional image V0 can be confirmed according to the size of the range A0 superimposed on the fluoroscopic image T0.

Next, a fourth embodiment of the present disclosure will be described. Since the functional configuration of the image processing device according to the fourth embodiment is the same as the functional configuration of the image processing device according to the first embodiment shown in FIG. 3, a detailed description of the configuration will be omitted here. In the image processing device according to the fourth embodiment, the technique for deriving the evaluation result in the first derivation unit 24 is different from that of the first embodiment.

Figure 12:
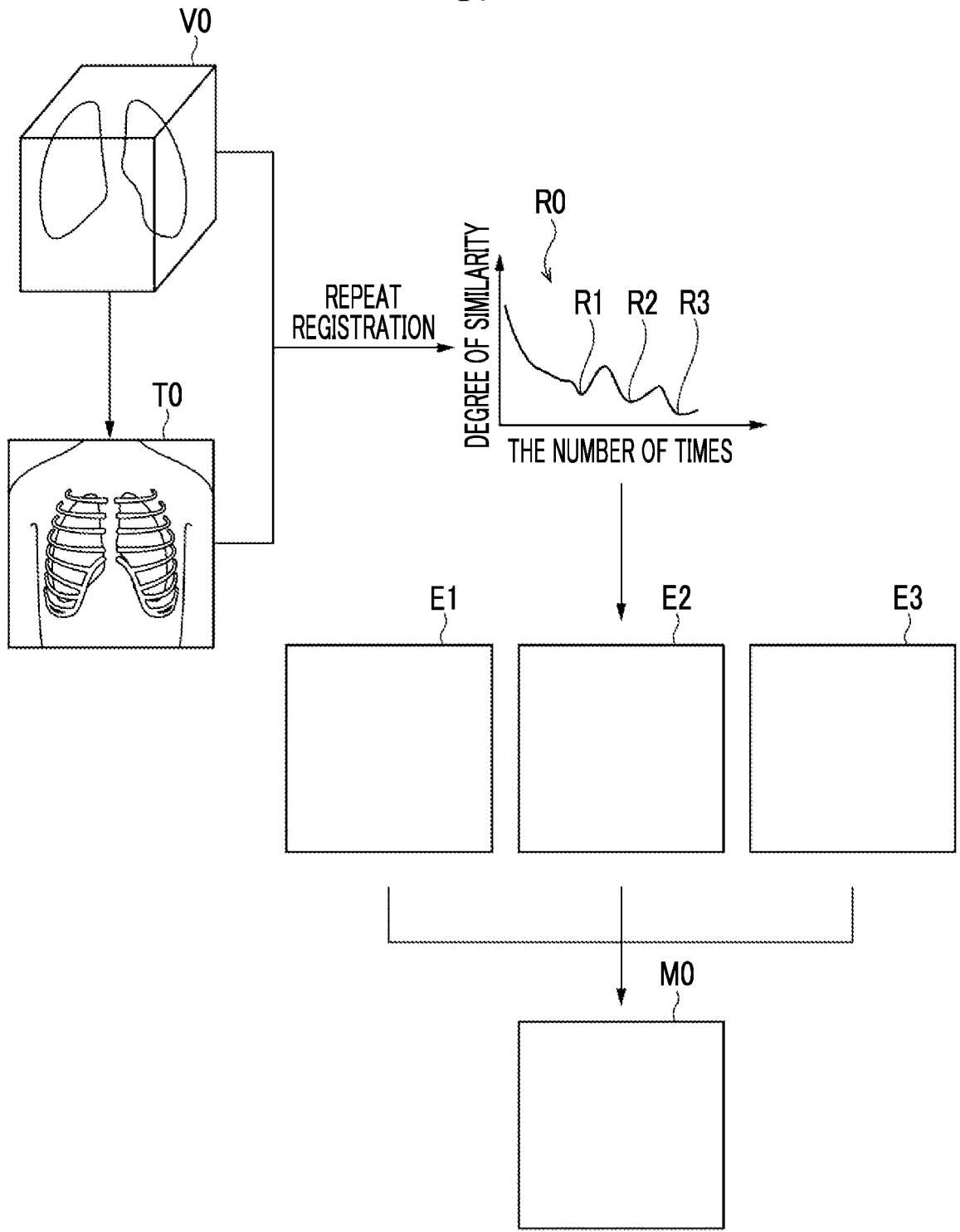
FIG. 12 is a diagram for explaining derivation of an evaluation result in a fourth embodiment.

FIG. 12 is a diagram for explaining the derivation of the evaluation result in the fourth embodiment. As shown in FIG. 12, in the fourth embodiment, the first derivation unit 24 optimizes the registration. Specifically, the non-rigid registration between the three-dimensional image V0 and the fluoroscopic image T0 is repeatedly performed to optimize the registration.

Then, the first derivation unit 24 derives a degree of similarity between the three-dimensional image V0 and the fluoroscopic image T0 each time the registration is performed and derives a relationship R0 between the number of times of the registration and the degree of similarity. In this case, a sum of correlation values of all pixels of the fluoroscopic image T0 with corresponding pixels of the three-dimensional image V0 can be used for the degree of similarity. For this reason, the degree of similarity represents that as a value thereof is smaller, the registration is performed more accurately.

Here, FIG. 12 shows the relationship R0 between the number of times of the registration and the degree of similarity. In the relationship R0, the degree of similarity decreases while repeating increase and decrease as the number of times of the registration increases. The first derivation unit 24 specifies a minimum point of the degree of similarity in the relationship R0 and derives the degree of similarity at the minimum point as a local solution. Then, the first derivation unit 24 derives the registration error between the fluoroscopic image T0 and the three-dimensional image V0 when each of a plurality of the local solutions is derived. Here, the registration error is a deformation amount and a deformation direction of each pixel of the fluoroscopic image T0 with respect to each corresponding pixel of the three-dimensional image V0 in the case of being registered. The first derivation unit 24 derives the registration error for each pixel of the three-dimensional image V0 by the number of the derived local solutions. In the relationship R0 shown in FIG. 12, since the three local solutions R1 to R3 are derived, three registration errors E1 to E3 are derived for each pixel of the fluoroscopic image T0.

Next, the first derivation unit 24 derives, as the evaluation result, statistics of a plurality of the registration errors E1 to E3 for each pixel of the fluoroscopic image T0. As the statistics, for example, an average value, a median value, and a dispersion value of a plurality of registration errors can be used, but the statistics are not limited thereto. Further, the first derivation unit 24 derives the evaluation map M0 based on the statistics of the registration errors for each pixel of the three-dimensional image V0. The evaluation map M0 represents a distribution of the statistics of the registration errors in the fluoroscopic image T0.

In the fourth embodiment, the evaluation map M0 is two-dimensional, but the present disclosure is not limited thereto. The three-dimensional evaluation map M0 may be derived by deriving the deformation amount and the deformation direction of each pixel of the three-dimensional image V0 with respect to each corresponding pixel of the fluoroscopic image T0 as the registration error. In this case, the second derivation unit 25 refers to the evaluation value of the target position S0 in the three-dimensional evaluation map M0 and derives the range A0 which has a size corresponding to the evaluation value and in which the target position may exist.

By deriving the evaluation map M0 in this way, as in the first embodiment, the accuracy of the registration between the fluoroscopic image T0 and the three-dimensional image V0 can be confirmed according to the size of the range A0 superimposed on the fluoroscopic image T0.

In addition, in the fourth embodiment, the first derivation unit 24 may derive the relationship R0 between the number of times of the registration for only the target position in the three-dimensional image V0 and the degree of similarity to derive only the evaluation result for the target position in the three-dimensional image V0.

Next, a fifth embodiment of the present disclosure will be described. Since the functional configuration of the image processing device according to the fifth embodiment is the same as the functional configuration of the image processing device according to the first embodiment shown in FIG. 3, a detailed description of the configuration will be omitted here. In the image processing device according to the fifth embodiment, the technique for deriving the evaluation result in the first derivation unit 24 is different from that of the first embodiment. Specifically, in the fifth embodiment, the evaluation result, that is, the evaluation map M0 is derived using the technique described in Eppenhof, et al., "Error estimation of deformable image registration of pulmonary CT scans using convolutional neural networks." Journal of Medical Imaging, 2018.

The technique described in the literature of Eppenhof et al. is a technique for deriving two deformed CT images by applying different deformation fields to the CT image, deriving a difference between pixels of the two deformed CT images as an error map, and constructing a trained model by training a neural network such that in a case where two CT images are input, an error map of the two CT images is output by using teacher data in which the two deformed CT images are training data and the error map is correct answer data.

Figure 13:
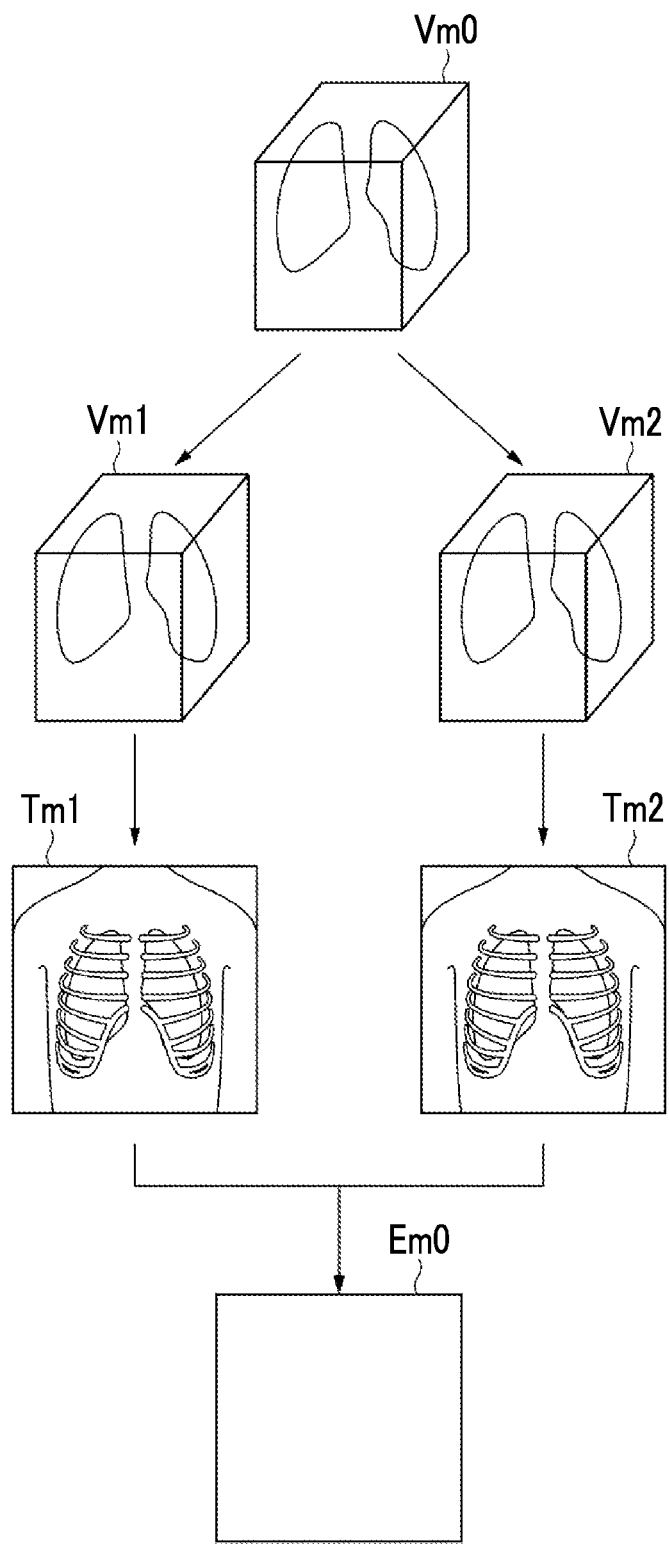
FIG. 13 is a diagram illustrating generation of teacher data used for constructing a trained model in a fifth embodiment.

In the fifth embodiment, the technique of Eppenhof et al. is applied to a two-dimensional projection image so that an error map between the three-dimensional image V0 and the fluoroscopic image T0 is derived as the evaluation map M0. In the fifth embodiment, the teacher data is prepared for constructing the trained model. FIG. 13 is a diagram illustrating generation of the teacher data used for constructing the trained model in the fifth embodiment. As shown in FIG. 13, a three-dimensional image Vm0 as a reference is prepared, and two different deformation fields are applied to the three-dimensional image Vm0 to derive a first deformed three-dimensional image Vm1 and a second deformed three-dimensional image Vm2. Then, a first deformed pseudo projection image Tm1 and a second deformed pseudo projection image Tm2 are derived by projecting each of the first deformed three-dimensional image Vm1 and the second deformed three-dimensional image Vm2 two-dimensionally.

Then, a relative deformation amount and deformation direction in each pixel of the first deformed pseudo projection image Tm1 and the second deformed pseudo projection image Tm2 are derived as an error map Em0 by performing the registration between the first deformed pseudo projection image Tm1 and the second deformed pseudo projection image Tm2. As a result, teacher data is generated in which the first deformed pseudo projection image Tm1 and the second deformed pseudo projection image Tm2 are training data, and the error map Em0 is correct answer data. The error map Em0 is a map that represents a distribution of the errors in a two-dimensional manner.

FIG. 14 is a diagram for explaining training in the fifth embodiment. As shown in FIG. 14, the first deformed pseudo projection image Tm1 and the second deformed pseudo projection image Tm2 are input to the network 30 to be trained, and an error map Es is derived. Then, a difference between the error map Es and the error map Em0 which is correct answer data is derived as a loss L0, and the network 30 is trained such that the loss L0 becomes small. Then, training of the network 30 is repeated until the loss L0 reaches a predetermined threshold value or until the training of a predetermined number of times is completed to construct a trained model. The trained model constructed in this way is applied to the first derivation unit 24. The error map derived by the trained model is the evaluation map M0, and a value corresponding to each pixel of a pseudo projection image in the evaluation map M0 is the evaluation value.

FIG. 15 is a diagram for explaining the derivation of the evaluation result in the fifth embodiment. As shown in FIG. 15, in the fifth embodiment, a trained model 31 constructed as described above is applied to the first derivation unit 24. First, the first derivation unit 24 derives the two-dimensional pseudo fluoroscopic image VT0 by projecting the three-dimensional image V0 in the same direction as the imaging direction of the fluoroscopic image T0, as in the first embodiment. Then, by inputting the pseudo fluoroscopic image VT0 and the fluoroscopic image T0 into the trained model 31, the error map, that is, the evaluation map M0 is output.

In the fifth embodiment, the second derivation unit 25 refers to the evaluation value of the corresponding target position S1 corresponding to the target position S0 in the evaluation map M0 derived as described above, and similarly to the first embodiment, derives the range A0 which has a size corresponding to the evaluation value and in which the target position may exist.

By deriving the evaluation map M0 in this way, as in the first embodiment, the accuracy of the registration between the fluoroscopic image T0 and the three-dimensional image V0 can be confirmed according to the size of the range A0 superimposed on the fluoroscopic image T0.

In each of the above-described embodiments, the technique of the present disclosure is applied in a case where the three-dimensional image such as a CT image and the fluoroscopic image T0 are registered, but the present disclosure is not limited thereto. For example, the technique of the present disclosure can be applied even in a case where the three-dimensional image and an endoscopic image picked up by an endoscope inserted into a lumen of a human body are registered. In this case, the endoscopic image is an example of the two-dimensional image of the present disclosure.

In addition, in each of the above-described embodiments, the target position is a lesion in the lung, but the present disclosure is not limited thereto. For example, a bifurcation position of a bronchus may be used as the target position. In addition, the target site is not limited to the lung, and any organ including a lesion or the like to be treated can be targeted.

In addition, in each of the above-described embodiments, for example, for example, as a hardware structure of a processing unit that executes various types of processing such as the image acquisition unit 21, the target position specifying unit 22, the registration unit 23, the first derivation unit 24, the second derivation unit 25, and the display controller 26, various processors shown below can be used. The various types of processors include, as described above, a CPU which is a general-purpose processor that executes software (program) to function as various types of processing units, as well as a programmable logic device (PLD) which is a processor having a circuit configuration that can be changed after manufacturing such as a field programmable gate array (FPGA), a dedicated electrical circuit which is a processor having a circuit configuration specially designed to execute specific processing such as an application specific integrated circuit (ASIC), and the like.

One processing unit may be configured of one of the various types of processors, or a combination of two or more processors of the same type or different types (for example, a combination of a plurality of FPGAs, or a combination of a CPU and an FPGA). Further, a plurality of processing units may be configured of one processor.

As an example of configuring a plurality of processing units with one processor, first, there is a form in which, as typified by computers such as a client and a server, one processor is configured by combining one or more CPUs and software, and the processor functions as a plurality of processing units. Second, there is a form in which, as typified by a system on chip (SoC) and the like, in which a processor that implements functions of an entire system including a plurality of processing units with one integrated circuit (IC) chip is used. As described above, the various types of processing units are configured using one or more of the various types of processors as a hardware structure.

Furthermore, as the hardware structure of the various types of processors, more specifically, an electric circuitry in which circuit elements such as semiconductor elements are combined can be used.

What is claimed is:
1. An image processing device comprising:
at least one processor,
wherein the processor is configured to:
specify a target position in a three-dimensional image acquired by imaging a subject before treatment;
perform registration between two-dimensional images sequentially acquired for the subject under the treatment and the three-dimensional image;
derive an evaluation result representing a reliability of the registration at least at the target position of the three-dimensional image;

derive a range in which the target position possibly exists in the two-dimensional image based on a result of the registration and the evaluation result; and display the two-dimensional image on which the range is superimposed.

2. The image processing device according to claim 1, wherein the processor is configured to superimpose and display, on the two-dimensional image, a corresponding target position corresponding to the target position in the two-dimensional image.

3. The image processing device according to claim 1, wherein the processor is configured to superimpose and display the evaluation result on the two-dimensional image.

4. The image processing device according to claim 1, wherein the processor is configured to derive the evaluation result by projecting, onto the three-dimensional image of the subject, a standard deformation amount between a first time phase and a second time phase of an organ including the target position, which is derived in advance based on a plurality of three-dimensional image groups including a three-dimensional image of the first time phase and a three-dimensional image of the second time phase.

5. The image processing device according to claim 4, wherein the three-dimensional image of the first time phase is a three-dimensional image of an inspiratory phase, and the three-dimensional image of the second time phase is a three-dimensional image of an expiratory phase.

6. The image processing device according to claim 1, wherein the processor is configured to:

derive a pseudo two-dimensional image simulating a motion of an organ including the target position from the acquired three-dimensional image;

derive a registration error representing a relative deformation amount and deformation direction between the pseudo two-dimensional image and the acquired three-dimensional image by performing registration between the pseudo two-dimensional image and the acquired three-dimensional image; and derive the evaluation result based on the registration error.

7. The image processing device according to claim 1, wherein the processor is configured to:

repeatedly perform registration between the two-dimensional image and the three-dimensional image;

derive a relationship between the number of times of the registration and a degree of similarity between the registered two-dimensional image and three-dimensional image, which is derived each time the registration is performed;

derive a plurality of local solutions in the relationship; and derive the evaluation result based on statistics of a registration error between the two-dimensional image and the three-dimensional image in a case where each of the plurality of local solutions is derived.

8. The image processing device according to claim 1, wherein the processor is configured to derive the evaluation result by using a trained model in which machine learning is performed such that in a case where a pseudo two-dimensional image obtained by projecting the three-dimensional image in an imaging direction of the two-dimensional image and the two-dimensional image are input, the evaluation result is output.

9. The image processing device according to claim 1, wherein the three-dimensional image is a CT image.

10. The image processing device according to claim 1, wherein the target position is included in a lung of the subject.

11. The image processing device according to claim 10, wherein the target position is a position where a lesion is present in the lung.

12. The image processing device according to claim 10, wherein the target position is a bifurcation position in a bronchus.

13. An image processing method comprising:

specifying a target position in a three-dimensional image acquired by imaging a subject before treatment;

performing registration between two-dimensional images sequentially acquired for the subject under the treatment and the three-dimensional image;

deriving an evaluation result representing a reliability of the registration at least at the target position of the three-dimensional image;

deriving a range in which the target position possibly exists in the two-dimensional image based on a result of the registration and the evaluation result; and displaying the two-dimensional image on which the range is superimposed.

14. A non-transitory computer-readable storage medium that stores an image processing program that causes a computer to execute a process comprising:

specifying a target position in a three-dimensional image acquired by imaging a subject before treatment;

performing registration between two-dimensional images sequentially acquired for the subject under the treatment and the three-dimensional image;

deriving an evaluation result representing a reliability of the registration at least at the target position of the three-dimensional image;

deriving a range in which the target position possibly exists in the two-dimensional image based on a result of the registration and the evaluation result; and displaying the two-dimensional image on which the range is superimposed.

* * * * *